(12) United States Patent
Hwang et al.

(10) Patent No.: US 7,804,605 B2
(45) Date of Patent: Sep. 28, 2010

(54) OPTICAL MULTI-AXIS LINEAR DISPLACEMENT MEASUREMENT SYSTEM AND A METHOD THEREOF

(75) Inventors: Ing-Shouh Hwang, Taipei (TW); En-Te Hwu, Taipei (TW); Kuang-Yuh Huang, Taipei (TW)

(73) Assignee: Academia Sinica, Taipei (TW)

( * ) Notice: Subject to any disclaimer, the term of this patent is extended or adjusted under 35 U.S.C. 154(b) by 232 days.

(21) Appl. No.: 12/073,486

(22) Filed: Mar. 6, 2008

(65) Prior Publication Data
US 2009/0225305 A1    Sep. 10, 2009

(51) Int. Cl.
*G01B 11/14*    (2006.01)
(52) U.S. Cl. ...................................................... 356/614
(58) Field of Classification Search ........................ None
See application file for complete search history.

(56) References Cited

U.S. PATENT DOCUMENTS 5,189,806 A * 3/1993 McMurtry et al. ............ 33/503
5,929,983 A * 7/1999 Lu ............................... 356/138

* cited by examiner

*Primary Examiner*—Tu T Nguyen
(74) *Attorney, Agent, or Firm*—Bacon & Thomas, PLLC

(57) ABSTRACT

The present invention provides an optical multi-axis linear displacement measurement system and a method thereof, and the system can detect the reflected light from the top surface of the object so as to obtain multi-axis linear displacements of the object. The optical multi-axis linear displacement measurement system utilizes a non-contact optical method for obtaining multi-axis linear displacements of the object and it can perform simultaneous multi-axis linear displacement measurements. The advantages of the system and method include: high response speed (bandwidth) for dynamic measurement, simple structure, cost effective, and high sensitivity for displacement measurements.

41 Claims, 9 Drawing Sheets

Calibration

OPTICAL MULTI-AXIS LINEAR DISPLACEMENT MEASUREMENT SYSTEM AND A METHOD THEREOF

BACKGROUND OF THE INVENTION

1. Field of the Invention

The present invention relates to an optical multi-axis linear displacement measurement system. More particularly, the invention is an optical multi-axis linear displacement measurement system that detects the reflected focusing light from the top surface of an object for obtaining multi-axis linear displacements of the object. The present invention also discloses an optical multi-axis linear displacement measurement method for obtaining the multi-axis linear displacements of the object.

2. Description of the Related Art

For precision positioning systems, a displacement sensor is an essential component for feedback control of the position and displacement of an object to be measured. Most conventional displacement measurement systems perform precision displacement measurement based on methods such as the optical interferometry or measurement of capacitance, magnetic flux, or tunneling current. The above-mentioned methods, however, can only be performed for measurement on single-axis linear displacement. If a user wants to perform simultaneous multi-axis displacement measurements, a plurality of displacement sensors disposed on each axis is required. Hence, the size and complexity of the mechanism and of the whole system are increased.

K. Enami et al. disclosed a system that can measure two-axis linear displacements of a metal ball, in the publication of "Nano-Probe Using Optical Sensing, by K. Enami, M. Hiraki and K. Takamasu (2000) XVI IMEKO World Congress, September 25-28, Wien, Austria." This conventional system focused light on the center of a metal ball and the photo sensor (such as a quadrant photo diode, QPD) detected the reflected and focused light and obtained two-axis (X-Y) linear displacements of the metal ball in a plane. In addition, this conventional system should be in physical contact with the object to be measured and thus it is difficult to be used for measuring the linear displacement of a small object.

S. Usuki et al. disclosed a system that can measure three-axis linear displacements of a metal ball, in the publication of "Improving the accuracy of 3D displacement measuring using ring-shaped laser beam and high resolution CCD, by S. Usuki, K. Enami, O. Sato, S. Takahashi and K. Takamasu (2004) Proc. of 4$^{th}$ euspen International Conference Glasgow, Scotland (UK), May-June." This conventional system focused light on the center of a metal ball, and the photo sensor (such as a charge-coupled device, CCD) detected the reflected and focused light and obtained a three-axis (X-Y-Z) linear displacement of the metal ball. This conventional system should also be in physical contact with the object to be measured and thus it is difficult to be used for measuring the linear displacement of a small object. In addition, it requires a complicated processing algorithm to process the data obtained with the CCD, so its response speed is very limited and cannot detect high-frequency movement of an object.

Christian Rembe et al. disclosed a system that can measure full three-dimensional displacements of MEMS component, in the publication of "Measurement System for Full Three-Dimensional Motion Characterization of MEMS, by Christian Rembe and Richard S. Muller (2002) JOURNAL OF MICROELECTROMECHANICAL SYSTEMS, VOL. 11, NO. 5, OCTOBER". The captured interferometeric image data analyzed by digital-image processing can reconstruct the multi-axial linear changes of an object. This method requires very complicated imaging processing, and cannot be used to detect multi-axis linear displacement of the object in real time.

SUMMARY OF THE INVENTION

In order to improve upon the above problems, one of the primary objects of the present invention is to provide an optical multi-axis linear displacement measurement system that detects the reflected light from the top surface of the object so as to obtain multi-axis linear displacements of the object. The optical multi-axis linear displacement measurement system utilizes a non-contact optical method for obtaining multi-axis linear displacements of the object and it can perform simultaneous multi-axis linear displacement measurements. The advantages of the system and method include: high response speed (bandwidth) for dynamic measurement, simple structure, cost effective, and high sensitivity for displacement measurements.

An optical multi-axis linear displacement measurement system comprises an object having a curved surface with a known surface profile; an optical detection device for focusing a light beam on the top surface of the object; wherein if the object makes a linear displacement, the optical detection device measures the height and their variations of the light spot on the object surface and angles and their variations of the normal direction of the light spot on the object surface through the reflected light beam and, using the surface profile, obtains multi-axis linear displacements of the object.

For the case of a one-dimensional (1D) curved surface, an equation of the surface profile of the object is $Z_S=C(x)$, and that of an angle θ formed between the Z axis and the normal direction of the surface profile is $θ=f(x)$.

For the case of a two-dimensional (2D) curved surface, an equation of the surface profile of the object is $Z_S=C(x,y)$, and that of two dimensional angle $θ_x$, $θ_y$ formed between the Z axis and the normal direction of the surface profile is $(θ_x, θ_y)=f(x,y)$.

The optical detection device of the optical multi-axis linear displacement measurement system comprises a lens assembly; a light source disposed at one side of the lens assembly for generating a light beam; a photo sensor disposed at another side of the lens assembly for receiving the reflected light beam; and a micro-processing unit that is connected to the photo sensor and has a memory unit that stores information about the surface profile.

The lens assembly of the optical detection device comprises a lens for focusing the light beam on the top surface of the object to be measured; an astigmatic lens for producing the astigmatic effect and projecting the reflected light beam onto the photo sensor; and a beam splitter disposed between the lens and the astigmatic lens for splitting the light beam. The astigmatic lens is a cylindrical lens or the astigmatic lens is an inclined planar light refraction layer.

The photo sensor of the optical detection device comprises a first photo element; a second photo element; a third photo element; and a fourth photo element; wherein the first, second, third, and fourth photo elements are disposed on four quadrants of a plane, respectively. The signals $S_1$, $S_2$, $S_3$, and $S_4$ are generated, respectively, corresponding to the light intensity received by the first, second, third, and fourth photo elements, respectively, and the multi-axis linear displacements of the object can be obtained through calculation of the signals based on the known surface profile.

The present invention also provides an optical multi-axis linear displacement measurement method comprising: providing an object; providing an optical detection device for focusing a light beam on a curved surface of the object; measuring the height, angles and their variations of the light spot on the curved surface through the reflected light beam and the photo sensor if the object makes a linear displacement; obtaining multi-axis linear displacements of the object by calculating signals from photo sensor of the reflected light beam in connection with surface information of the object.

The surface information of the object is surface profile.

For the case of a one-dimensional (1D) curved surface, an equation of the surface profile of the object is $Z_S=C(x)$, and an angle $\theta$ formed between the Z axis and the normal direction of the surface profile is $\theta=f(x)$.

For the case of a two-dimensional (2D) curved surface, an equation of the surface profile of the object is $Z_S=C(x,y)$, and two angle $\theta_x$, $\theta_y$ can be defined between the Z axis and the normal direction of the surface profile is $(\theta_x, \theta_y)=f(x,y)$.

The optical detection device of the optical multi-axis linear displacement measurement system comprises a lens assembly; a light source disposed at one side of the lens assembly for generating a light beam; a photo sensor disposed at another side of the lens assembly for receiving the reflected light beam; and a micro-processing unit that is electrically connected to the photo sensor and has a memory unit that stores the surface profile.

The lens assembly of the optical detection device comprises a lens for focusing the light beam on the top surface of the object; an astigmatic lens for producing the astigmatic effect and projecting the reflected light beam onto the photo sensor; and a beam splitter disposed between the lens and the astigmatic lens for splitting the light beam. The astigmatic lens is a cylindrical lens or the astigmatic lens is an inclined planar light refraction layer.

The photo sensor of the optical detection device comprises a first photo element; a second photo element; a third photo element; and a fourth photo element; wherein the first, second, third, and fourth photo element are disposed on four quadrants of a plane, respectively. The signals $S_1$, $S_2$, $S_3$, and $S_4$ are generated, respectively, corresponding to the light intensity received by the first, second, third, and fourth photo elements, respectively, and the multi-axis linear displacements of the object can be obtained simultaneously through calculation of the signals and the surface profile.

The present invention can be applied to micro- and nano-positioning systems to provide real-time measurement of the multi-axis linear displacements of a single small object. This is very difficult and complicated for the conventional measurement systems. The present invention can also measure the multi-axis linear displacements of objects in the measurable range.

DETAILED DESCRIPTION OF THE INVENTION

Figure 1:
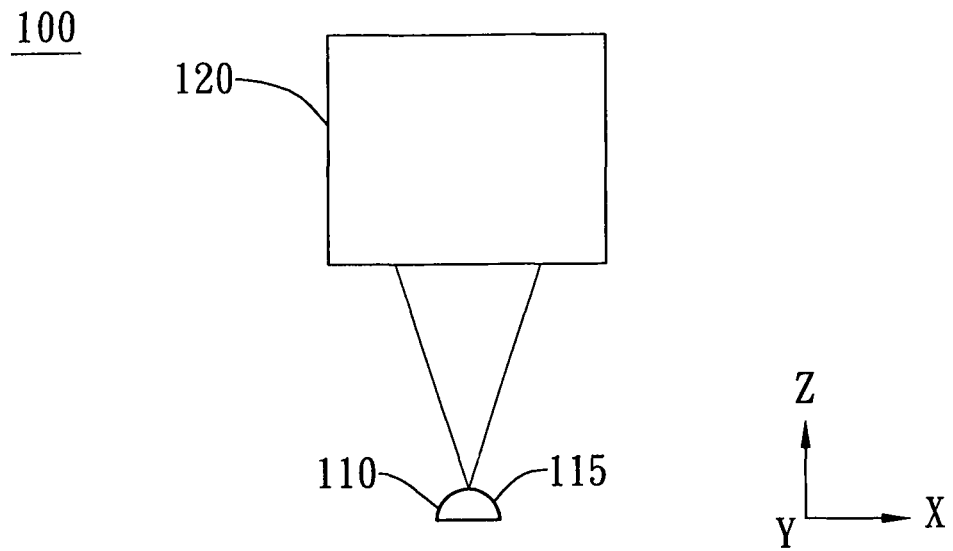
FIG. 1 is a schematic view of an embodiment of an optical multi-axis linear displacement measurement system of the present invention.

The embodiment of the optical multi-axis linear displacement measurement system in accordance with the invention will be explained by means of figures. Shown in FIG. 1 is the optical multi-axis linear displacement measurement system 100 in a schematic view. Essentially, the optical multi-axis linear displacement measurement system 100 comprises an object 110 having a curved surface with a known surface profile 115 and an optical detection device 120 for generating a light beam and focusing the light beam and forming a light spot on the curved surface of the object 110. The optical detection device 120 also store the known surface profile 115. The light spot moves on the surface of the object 110 in response of the linear movement of the object 110. The optical detection device 120 can simultaneously measure the height (in the direction of the axis of the light, the Z axis) of the light spot on the surface of the object 110, and the angle between the surface normal at the light spot and the Z axis (the tilt angle of the surface at the light spot relative to the Z axis). After that, an one-dimensional linear displacement of the object 110 in the direction of an axis perpendicular to the Z axis, e.g. X axis, or a two-dimensional linear displacements of the object 110 in a direction perpendicular to the axis of the light, a direction on the X-Y plane, can be obtained through calculation of the measured angular displacement of the reflected light from the surface of the object 110 based on the known profile 115 of the object 110, $Z_S=C(x)$ or $Z_S=C(x,y)$, which is stored in the optical detection device 120. The light beam of the optical detection device 120 is emitted and focused on the curved surface of object 110. When the object 110 translates in a direction perpendicular to the axis of the light, the X axis, this light spot moves along the curved surface of the object 110 and thus a change in the angle of the surface normal at the light spot will be obtained by measuring the angle of the reflected light from the surface of the object 110. A linear displacement will be obtained through the relationship between the known angle and the linear displacement, wherein the known relationship between the angle and the displacement is $\theta=f(x)$ for a one-dimensional (1D) curved surface or $(\theta_x, \theta_y)=f(x,y)$ for a two-dimensional (2D) curved surface. The optical detection device 120, which measures the angle of the surface normal of the light spot on the object 110, includes an astigmatic detection mechanism used in many DVD optical heads.

The surface of the object 110 is a smoothly continuous convex or concave surface, which is used for reflecting the light. The surface of the object 110 is one-dimensional (1D) curved surface, such as a part of a cylindrical surface, or a two-dimensional (2D) curved surface, such as a part of a spherical surface or a non-spherical surface. The surface of the object 110 is produced by precision machining, film bending, or other micro-machining techniques such as those used for fabricating microelectromechanical systems (MEMSs). Preferably, the material of the object 110 has a low thermal expansion coefficient. Preferably, the surface of the object 110 has a roughness of less than 5% of the diameter of the light beam on the surface.

In the present invention, a known surface profile 115 can be fabricated or machined directly on an edge of the object 110. It is also possible that a small element with a known surface profile 115 is attached to an edge of the object 110. In other words, a known surface profile 115 can be made at or attached to an edge of the object 110.

Figure 2:
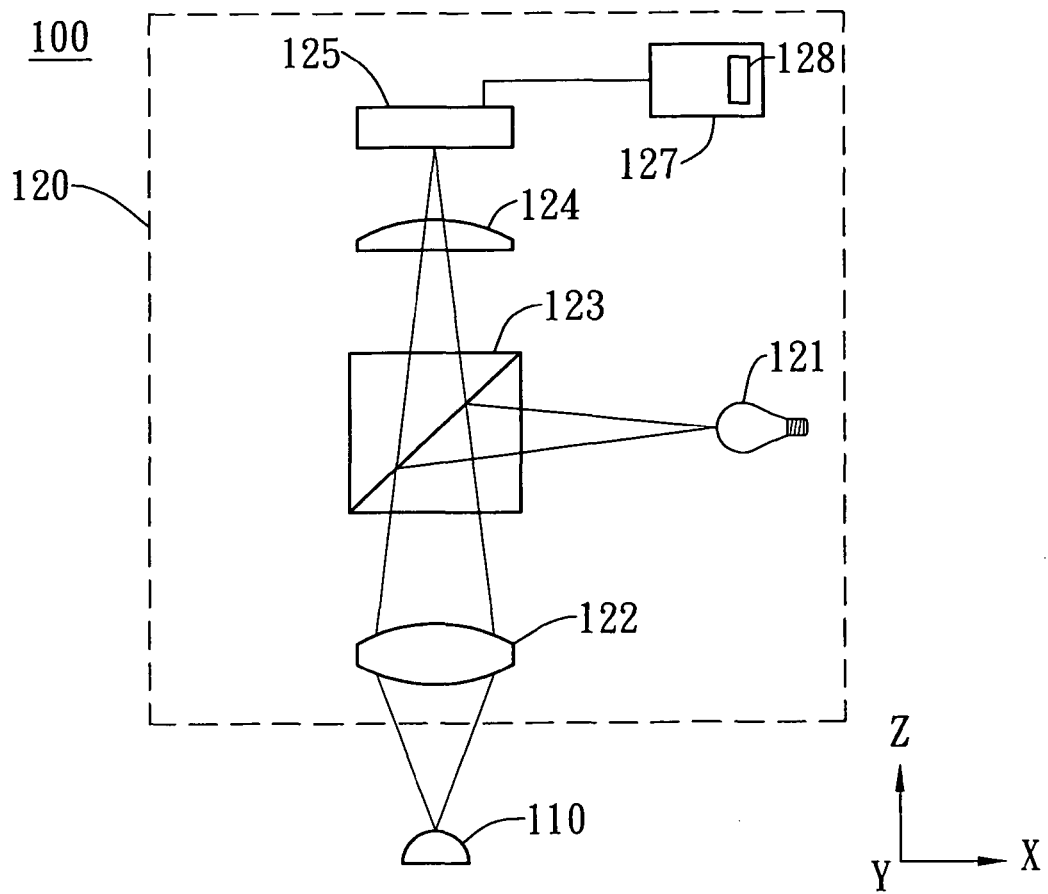
FIG. 2 is a schematic view of an optical detection device of the optical multi-axis linear displacement measurement system of the present invention.
Figure 3:
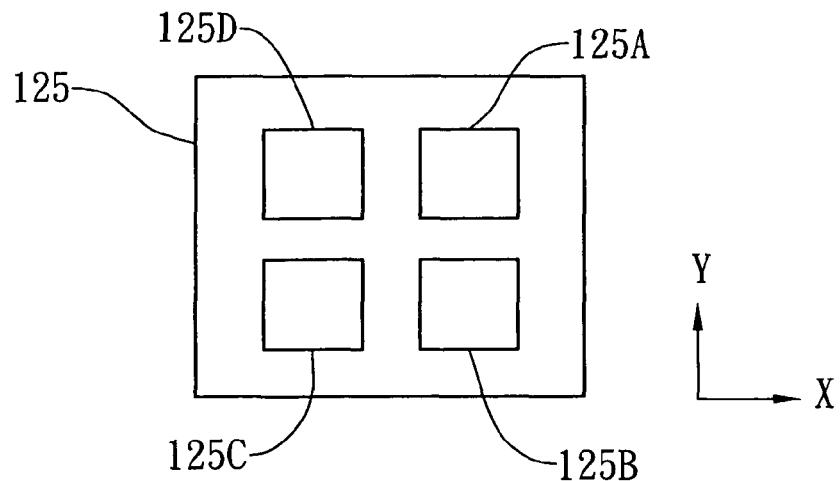
FIG. 3 is a schematic view of the photo sensor of the optical multi-axis linear displacement measurement system of the present invention.

Please refer to FIG. 2 and FIG. 3, the optical detection device 120 includes a light source 121, a lens 122, a beam splitter 123, an astigmatic lens 124 for producing astigmatism effect, a photo sensor 125 and a micro-processing unit 127 having a memory 128 thereof. The light source 121 generates a light beam passing into the beam splitter 123, and the light beam from the beam splitter 123 can be focused to the curved surface of the object 110 by the lens 122. The reflected light beam from the top surface of the object 110 passes through the lens 122, the beam splitter 123, and projects onto the photo sensor 125 through the astigmatic lens 124, which produces the astigmatic effect. The astigmatic lens is a cylindrical lens or the astigmatic lens is an inclined planar light refraction layer. The photo sensor includes four photo elements disposed at four quadrants of a plane of the photo sensor 125, respectively, as shown in FIG. 3. The four photo elements are a first photo element 125A, a second photo element 125B, a third photo element 125C, and a fourth photo element 125D. When the four photo elements receive the reflected light beam, the four photo elements will generate voltage or current signals S1, S2, S3, and S4, corresponding to the light intensity received by the first, second, third, and fourth photo elements. These signals can be transferred continuously to the micro-processing unit 127. The details of the calculation and explanation of voltage or current signals S1, S2, S3, and S4 have been described in U.S. Pat. No. 7,247,827 B1. If the object 110 makes a linear displacement, the light beam will impinge on a different spot of the known curved surface, where the height and the angle of the surface normal are different from those at the initial spot. Thus, the reflected light beam will project onto the photo sensor 125 with the shape change in the light spot corresponding to the height change, or with translation in the spot position corresponding to the change in the angle of the surface normal at the light spot on the object surface. The multi-axis linear displacements of the object 110 can be obtained through calculations of signals in the micro-processing unit 127.

Figure 4:
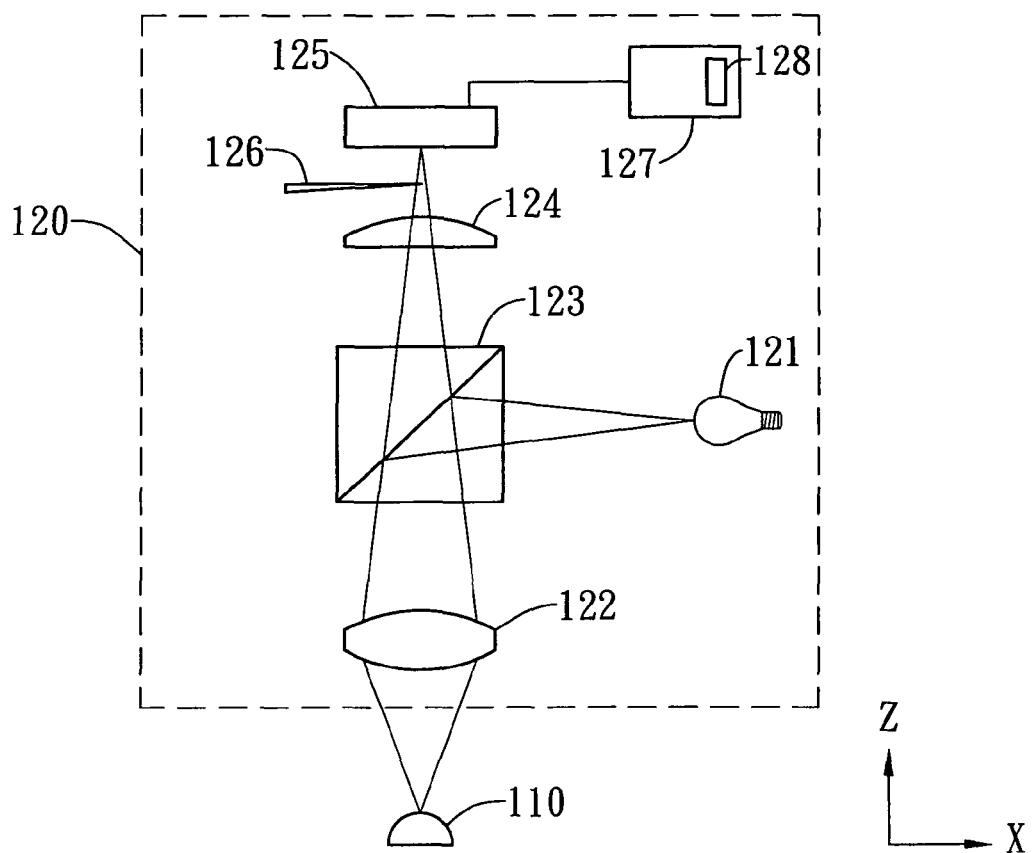
FIG. 4 is a schematic view of an optical detection device of another example of the optical multi-axis linear displacement measurement system of the present invention.
Figure 5:
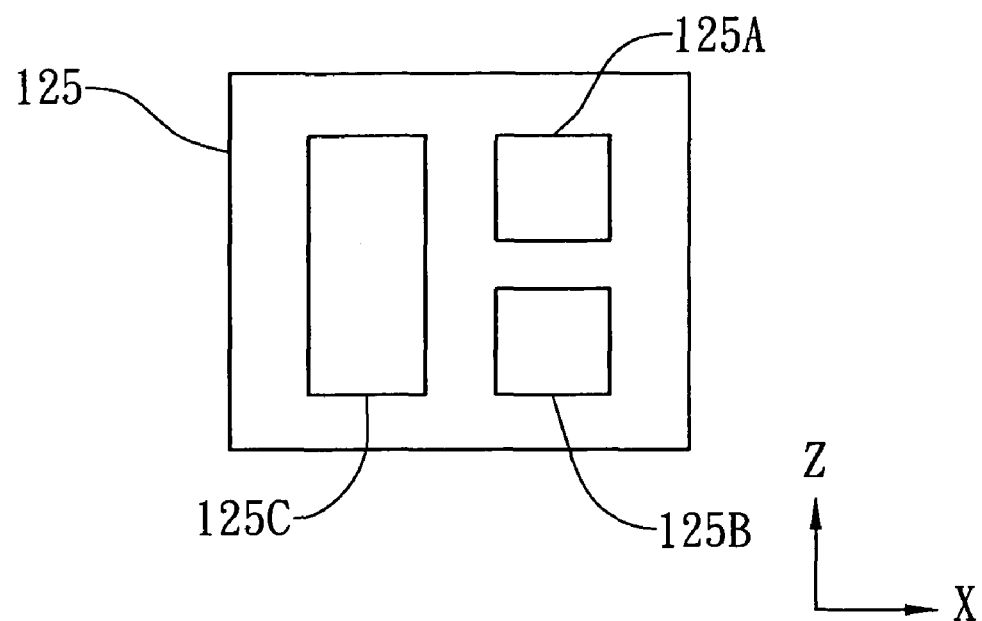
FIG. 5 is a schematic view of the photo sensor of another example of the optical multi-axis linear displacement measurement system of the present invention.

FIG. 4 and FIG. 5 show another embodiment of the optical two-axis linear displacement measurement system 100 of the present invention, wherein the knife edge method is used for measurement of the height of the surface of object 110 along the optical axis, Z axis, and the angle of the surface normal at the light spot relative to the Z axis. The optical detection device 120 includes a light source 121, a lens 122, a beam splitter 123, an astigmatic lens 124 for producing astigmatism effect, a photo sensor 125, a knife edge 126 and a micro-processing unit 127 having a memory 128 thereof. The astigmatic lens is a cylindrical lens or the astigmatic lens is an inclined planar light refraction layer. The photo sensor includes three photo elements disposed at a plane of the photo sensor 125 as shown in FIG. 5. The laser beam produced by the light source 121 passes through the beam splitter 123, and focuses on the object 110 by the lens 122, then the reflected laser beam will pass the original route through the beam splitter 123, the astigmatic lens 124 and the knife edge 126. The knife edge 126 shields the reflected laser beam and forms a semi-circular light spot at photo sensor 125 (Position Sensitive Device, PSD). Focus error signal is obtained through calculation of the signals from three photo sensors 125A, 125B and 125C in the photo sensor 125. When the surface of object 110 is at the focal point of the lens 122, the difference of the signals from the photo sensors 125A and 125B of PSD is zero. When the distance between the object 110 and the lens 122 is slightly longer than or shorter than the focal distance, the shape of the semi-circular light spot will transform into a semi-ellipse inclined to its upper-right or lower-right direction. Meanwhile, the difference between the output signals from the photo sensors 125A and 125B, $S_A-S_B$, is larger or smaller than zero and can be used to measure the height or the linear displacement of the object along the optical axis. the detailed calculation and explanation of voltage or current signals $S_1$, $S_2$, and $S_3$ detected by photo sensors 125 have been described in U.S. Pat. No. 7,247,827 B1. In the embodiments of the optical multi-axis linear displacement measurement system 100 of the present invention, if the 1D curved surface translates along an axis, X axis, that is perpendicular to the optical axis, the semi-circular light spot will move along X' direction on PSD due to the change in the angle of the surface normal at the light spot at the curved surface. The angular change can be measured with $(S_A+S_B)-S_C$. The two-axis linear displacements of the object 110 can be obtained through calculations of signals in the micro-processing unit 127.

Figure 6:
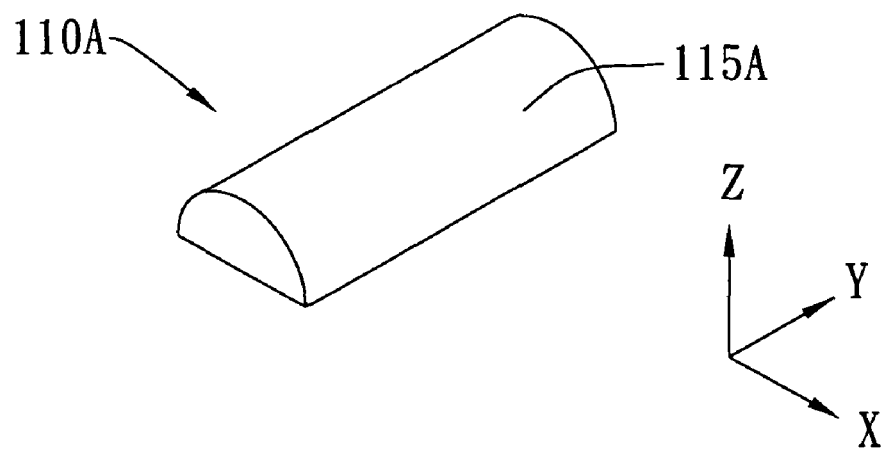
FIG. 6 is a schematic view of a first example of the object of the present invention.
Figure 7:
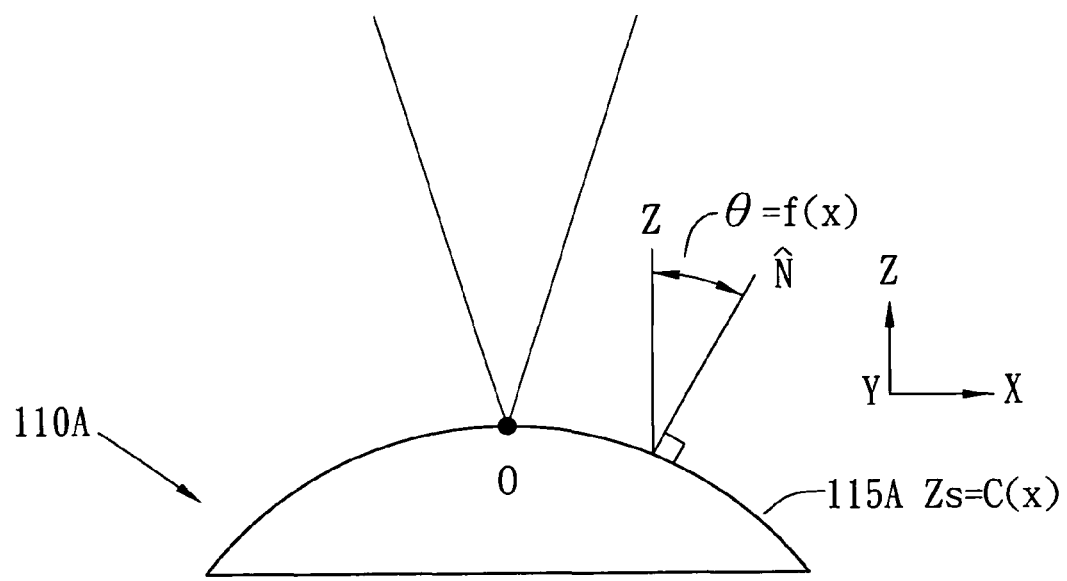
FIG. 7 is an enlarged front view cross section of the surface profile equation of a first example of the object of the present invention.
Figure 8:
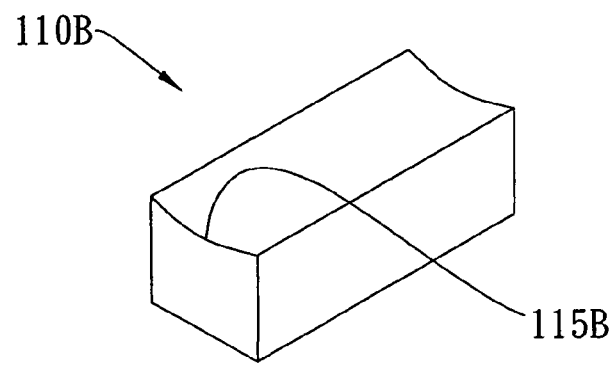
FIG. 8 is a schematic view of a third example of the object for two-axis displacement measurement of the present invention.

FIG. 6 and FIG. 8 show the first and second examples of 1D curved surfaces, 110A and 110B of the object 110, which are a partial cylindrical and a concave surface with known surface profiles 115A and 115B, respectively. They can be described with an equation, $Z_s=C(x)$. From the equation, the angle $\theta$ between the Z axis and the normal direction of surface profile ($\hat{n}$) can be derived. As shown in FIG. 7, the surface profile can also be described with the equation $\theta=f(x)$ or $x=f^{-1}(\theta)$. Thus, if the angle $\theta$ is measured, the displacement x in the X direction can be calculated from the equation. The equations including $Z_s=C(x)$ and $x=f^{-1}(\theta)$ are recorded in the memory 128 of the micro-processing unit 127. While the light beam is focused on the top surface of the object 110, the initial focus point of the light beam on the top surface is preferably set close to the original point O of the surface profile 115A, where the normal direction of the surface is along the Z-axis. If the object 110 moves along X direction or Z direction or in the X-Z plane, the reflected light beam from the surface of the object 110 is received by the photo sensor 125, and the micro-processing unit 127 calculates the signals S1, S2, S3, and S4 from the four photo elements 125A, 125B, 125C, and 125D in view of the equations of the surface profile, including $Z_s = C(x)$, in the memory 128 for obtaining the multi-axis linear displacements of the object 110. Therefore, the height change caused by the movement of the light spot on the curved surface along the X axis can be described with the equation, $Z_s = C(x) = C(f^{-1}(\theta))$, and the true linear displacement in the direction of Z axis can be obtained through the equation $Z_{true} = Z_{measured} + Z_s$, wherein $Z_{measured}$ is the measured height change or the measured linear displacement in the direction of Z axis with the optical detection device 120.

For the case that the optical detector 120 can measure two-dimensional angles of the surface normal at the light spot, an object with a 2D curved surface can be used to obtain three-dimensional linear displacements. Further referring to FIG. 9 and FIG. 10, the equation of the surface profile 115A of the first example 110A of the object 110 is $Z_s = C(x,y)$, from which the angle $(\theta_x, \theta_y)$ between the Z axis and the normal direction of surface profile can be derived. The surface profile can also be described with the equation $(\theta_x, \theta_y) = f(x,y)$ or $(x,y) = f^{-1}(\theta_x, \theta_y)$. The angles $(\theta_x, \theta_y)$ are measured, then the displacement $(x,y)$ in the X-Y plane can be calculated from the equation. The equations of the surface profile, including $Z_s = C(x,y)$ and $(x,y) = f^{-1}(\theta_x, \theta_y)$, are recorded in the memory 128 of the micro-processing unit 127. If the object 110 translates, the light spot moves accordingly on the surface of the object 110 and its reflected light beam is received by the photo sensor 125, and the micro-processing unit 127 calculates the signals S1, S2, S3, and S4 from the four photo elements 125A, 125B, 125C, and 125D in view of the equations of the surface profile, including $Z_s = C(x,y)$ and $(x,y) = f^{-1}(\theta_x, \theta_y)$, in the memory 128 for obtaining the multi-axis linear displacements of the object 110. Similarly, if the surface is a spherical surface or a non-spherical surface, the components of the linear displacement in X and Y directions can be obtained by measuring the two-dimensional angles of the surface normal at the light spot and calculating from the equations of the known surface profile. The true linear displacement of the object in the direction of Z axis (the direction of the axis of the light), $Z_{true}$, is obtained by considering the contribution from the height difference of two different light spots on the curved surface in the measured linear displacement in the direction of Z axis using the optical detection device 120, $Z_{measured}$, i.e., $Z_{true} = Z_{measured} + Z_s$. Therefore, the components of the linear displacement in the X, Y, and Z axes can be measured.

Figure 9:
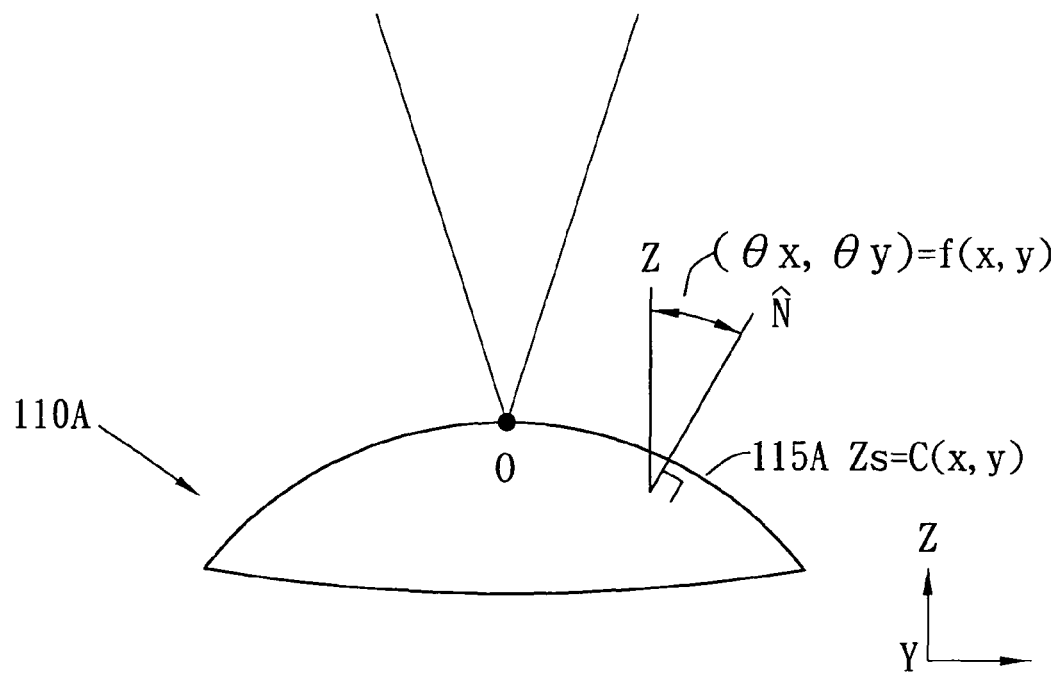
FIG. 9 is an enlarged front view of the surface profile equation of the second example of the object of the present invention.
Figure 10:
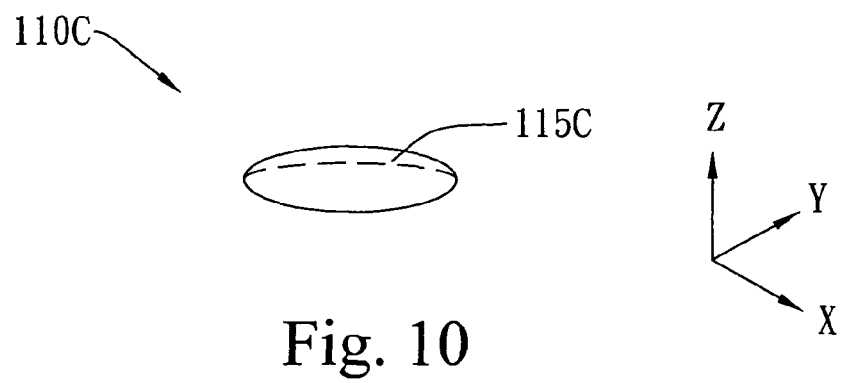
FIG. 10 is a schematic view of a second example of the object for three-axis displacement measurement of the present invention.
Figure 11:
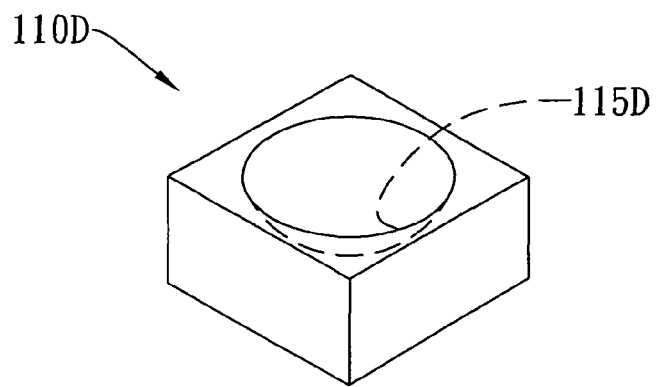
FIG. 11 is a schematic view of a fourth example of the object for three-axis displacement measurement of the present invention.

The third, and fourth examples 110C, and 110D of the object 110 are shown in FIG. 9, FIG. 10, and FIG. 11, respectively. The surface of the object 110 can be a reflective, continuous and smooth convex surface or a reflective, continuous and smooth concave surface with the angle $\theta_x$ not exceeding the maximum angle $\theta_{x\,max}$ and $\theta_y$ not exceeding the maximum angle $\theta_{y\,max}$. $\theta_{x\,max}$ and $\theta_{y\,max}$ are determined by the maximum detection angles of the optical detection device 120. The equation of the surface profile 115C, and 115D are shown as $Z_s = C(x,y)$, from which the angles $(\theta_x, \theta_y)$ formed between the Z axis and the normal direction of surface profile ($\hat{n}$) can be derived. The surface profile can also be described with $(\theta_x, \theta_y) = f(x,y)$ or $(x,y) = f^{-1}(\theta_x, \theta_y)$. When the angles $(\theta_x, \theta_y)$ are measured and then the displacement $(x,y)$ in the X-Y plane can be calculated from the equation. The multi-axis linear displacements of the object 110 can be obtained by the mentioned methods.

The present invention also provides an optical multi-axis linear displacement measurement method, comprising: providing an object 110, which has a curved surface with a known surface profile 115; providing an optical detection device 120 for focusing the light beam on the curved surface of the object 110, wherein information of the known surface profile 115 is stored in the optical detection device 120, the linear displacement of the surface of the object 110 in the direction of the optical axis, and a one-dimensional or two-dimensional change in angle of the normal direction of the light spot on the surface of the object 110 relative to the optical axis are simultaneously measured by the optical detection device 120; obtaining an one-dimensional or two-dimensional linear displacement perpendicular to the optical axis by measuring the angular displacement of the reflected light from the surface of the object 110; and calculating a plurality of signals of the photo sensor 125 in connection with surface information 115 of the object 110 to give the multi-axis linear displacement of the object 110.

Figure 12:
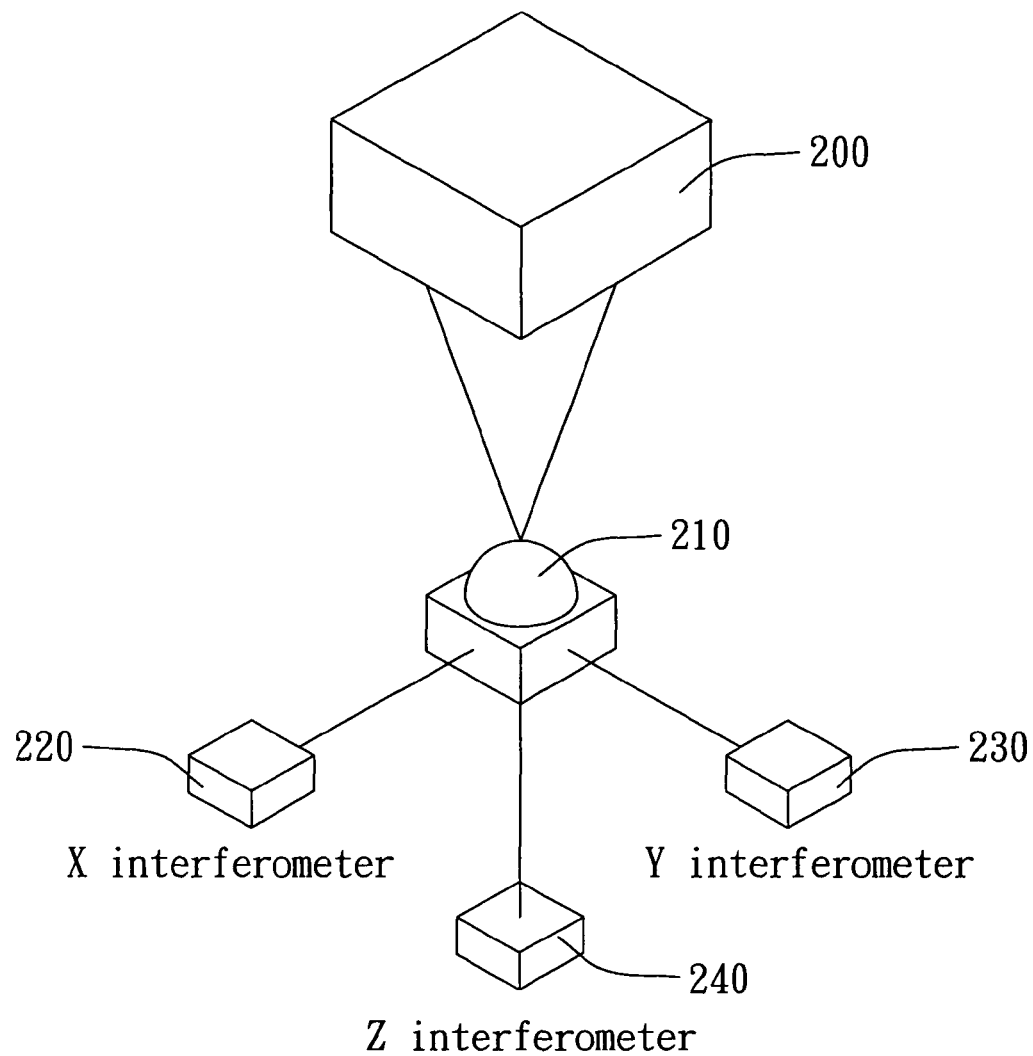
FIG. 12 is a schematic view of the calibration of the optical multi-axis linear displacement measurement system of the present invention.

As shown in FIG. 12, the present invention further includes calibration of the linear displacements of the object 210 with interferometers before the displacement measurement of the surface of the object 210 disclosed above. For example, linear displacement in X, Y and Z axes of the object 210 measured with the present invention can be calibrated with three interferometers 220, 230 and 240 disposed at three axes, respectively and the calibration information can be obtained and stored in the optical detection device 200.

The surface of the object disclosed in the present invention is manufactured as a curved surface, and the surface can be manufactured independently and placed on the object. The information of the surface can be obtained through the measurement with a SEM (Scanning electron microscope), an AFM (Atomic force microscope), a surface profilometer and/or a white light interferometer.

The surface of the object of the present invention can be a single smoothly curved surface.

Figure 13:
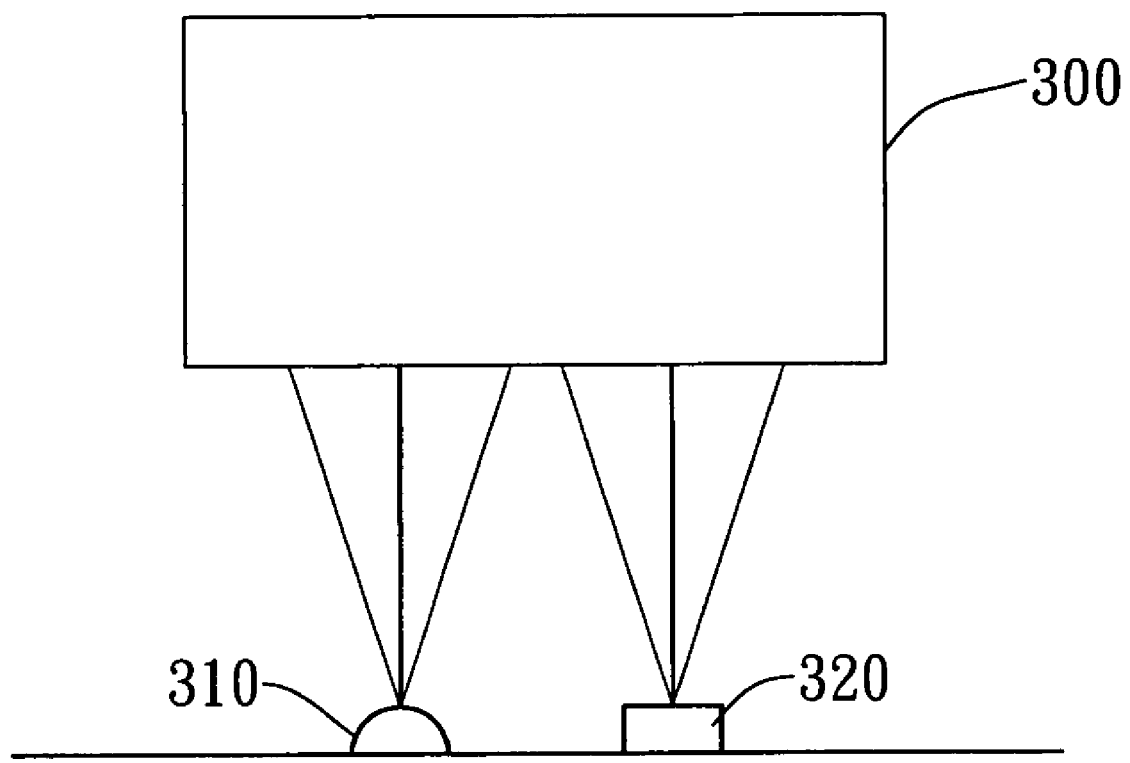
FIG. 13 is a schematic view of an optical detection device of third example of the optical multi-axis linear displacement measurement system of the present invention.

As shown in FIG. 13, in the above description, it is assumed that the Z axis of the curved surface is parallel to the optical axis. However, this would require the initial angular alignment of the optical axis of the optical detection device parallel to the Z axis of the object surface. A method to do that is to translate the object along a direction that is perpendicular to the z axis, such as x or y axis, to a flat surface with a normal direction preferably in the Z axis. Since the optical detection device can measure simultaneously the height and one or two dimensional angular tilt of the flat area relative to the optical axis (i.e. the angle of its normal direction relative to the optical axis), the initial angular alignment of the optical axis relative to the z axis can be achieved through these measurements and some mechanical adjustment such as a rotary stage. Another method and system is to generate two optical beams from the optical detection device 300 with the first beam focused on the flat area 320 and the second beam focused on the curved surface 310. The first beam can detect the normal direction of the surface of the flat area 320 (also the orientation of the object) relative to the optical axis and/or the linear displacement of the object in the direction along the optical axis of the first beam. The initial angular alignment of the optical axis relative to the z axis can be achieved through these measurements and some mechanical adjustment such as a rotary stage. The second beam can detect the multi-axis linear displacement based on the known surface profile of the curved surface as disclosed above. The two beams are preferably parallel, but this is not necessary, as long as the relative orientation of the two optical axes is known. In case the initial misalignment is not corrected through mechanical adjustment, the measured misalignment angle between the optical axis and the Z axis of the surface profile on the flat area 320 can be used to correct the calculated multi-axis linear displacements.

Figure 14:
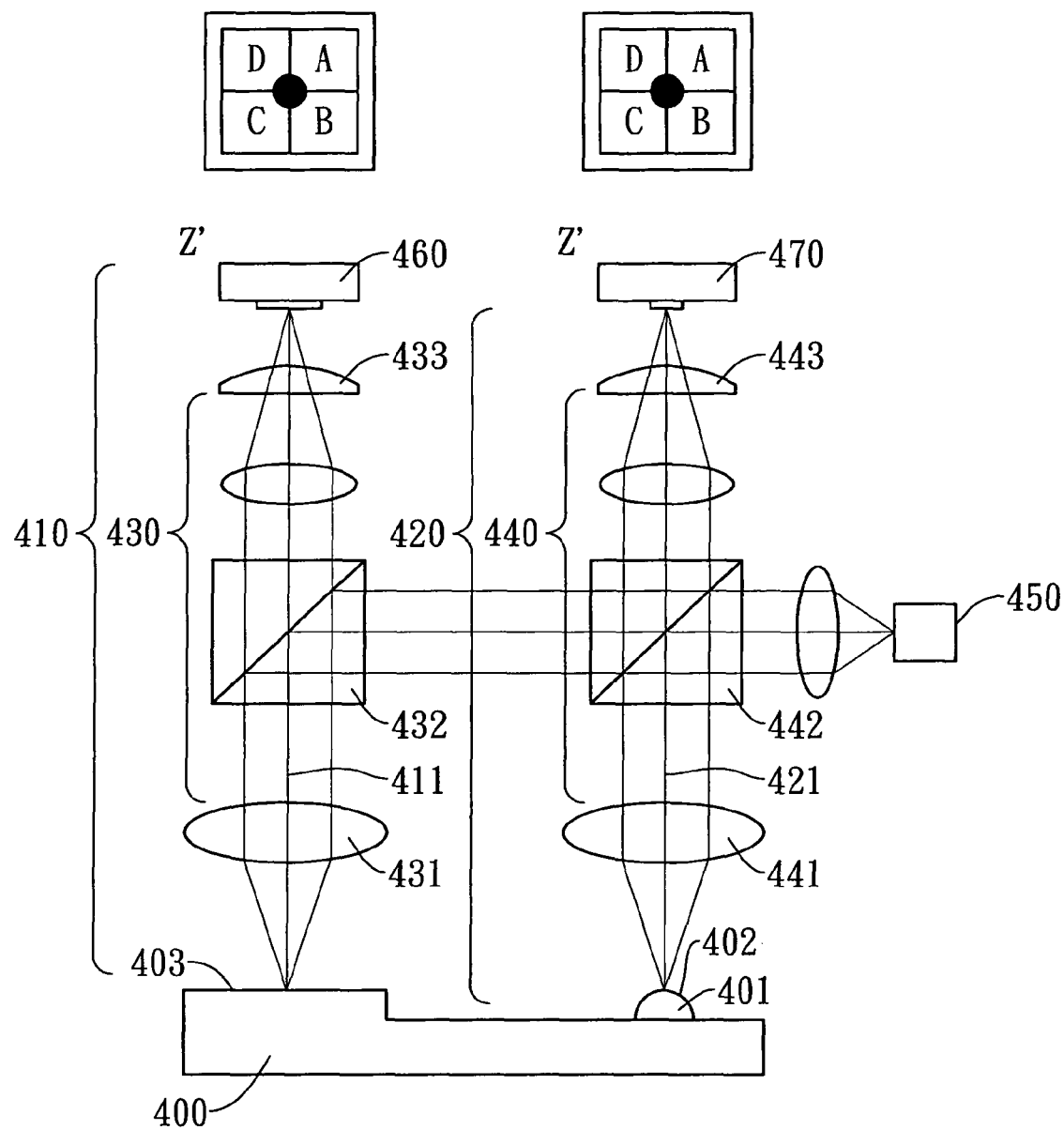
FIG. 14 is as FIG. 13 a schematic view of the details of the optical multi-axis linear displacement measurement system of the present invention.

As shown in FIG. 14, the optical multi-axis linear displacement measurement system comprising a base 400 having a flat area 403 and an curved surface 401 with a known surface profile 402; an optical detection device 410 for generating a light beam and splitting the light beam to a first light beam 411 and a second light beam 421, the second light beam 421 focusing on the curved surface 401 and the first light beam 411 focusing on the flat area 403, wherein the known surface profile 402 is stored in the optical detection device 410. The optical detection device 410 comprises a first lens assembly 430 and a second lens assembly 440; a light source 450 disposed at one side of the second lens assembly 440 for generating the light beam; a first photo sensor 460 and a second photo sensor 470 disposed at another side of the first lens assembly 430 and the second lens assembly 440, respectively, for receiving reflected light beams; and a micro-processing unit having a memory unit that stores the known surface profile 402, which is connected to the first photo sensor 460 and the second photo sensor 470. The first lens assembly 430 comprises a lens 431 for focusing the light beam on the surface of the flat area 403; an astigmatic lens 433 for projecting the reflected light beam on the first photo sensor 460; and a first beam splitter 432 disposed between the lens 431 and the astigmatic lens 433 for splitting the light beam. The second lens assembly 440 comprises a lens 441 for focusing the light beam on the curved surface 401; an astigmatic lens 443 for projecting the reflected light beam on the second photo sensor 470; and a second beam splitter 442 disposed between the lens 441 and the astigmatic lens 443 for splitting the light beam. The optical detection device 410 can be viewed as combination of two optical devices 120 as shown in FIG. 2, but with a shared light source.

Figure 15:
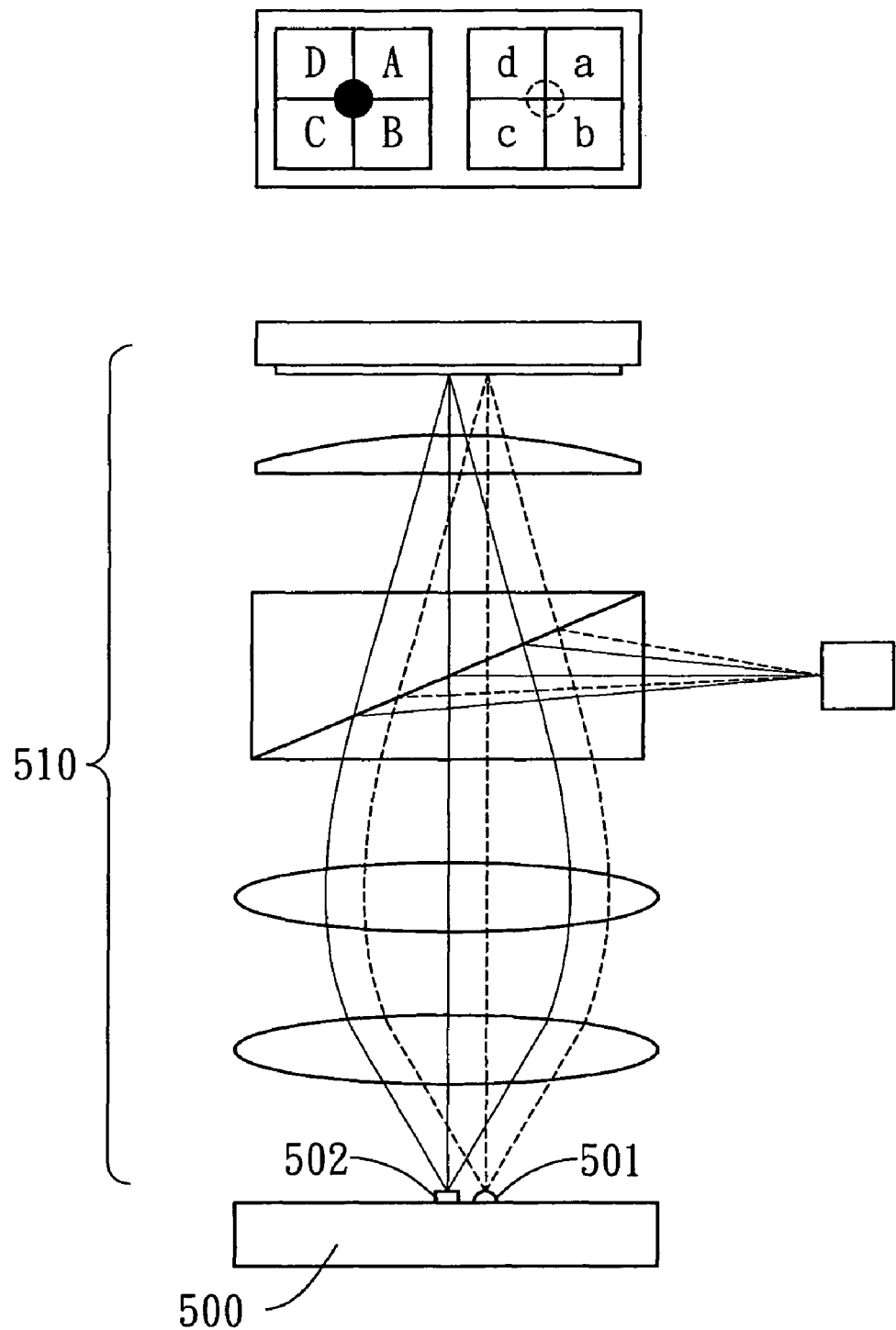
FIG. 15 is as FIG. 13 a schematic view of further the detail of the optical multi-axis linear displacement measurement system of the present invention.

There are two methods to generate two optical beams from the same optical detection system. One can use beam splitters or a grating to generate two light beams from the same light source. As shown in FIG. 14, beam splitters are used to generate two parallel beams. Two beams pass through two almost identical optical systems. One detects a curved surface 402 and the other one detect a flat area 403. If the astigmatic lens 433 is removed, that light beam can only detect the tilting angle of the flat area 403 relative to that light beam direction. However, this is sufficient for the initial angular alignment. If the astigmatic lens 433 is placed, the linear displacement of the flat area 403 (the object as well) along the optical axis can also be obtained. The FIG. 15 shows a second method that uses two light sources which are parallel but separated by a small distance. This scheme can be found in CD/DVD pickup heads.

Refer to FIG. 15, the optical detection device can be further modified for alignment and displacement measurement of an object relative to a reference object. The system includes a base 500 having a reference object 501 and an object 502. One can generate two sets of light beams from the same light sources with beam splitters or gratings. Each set of light beams contains two light beams as in FIG. 14. One set of two light beams is projected on a reference object 501 and the other set of two light beams is projected on the object to be aligned the object 502. There are a flat area and a curved surface with a known surface profile on the reference object as well as on the object to be aligned. For each set of light beams, one light beam is focused on the flat area and the other is focused on the curved surface. The two light beams focused on the flat areas of the reference object 501 and object 502 can be used to detect the relative angular orientation of the two objects, which can be further used to make angular alignment of the two objects. Each of these two light beam passes through an optical system that can detect one- or two-dimensional angle of the normal direction of the flat area on the two object surfaces relative to the optical axis. The other two light beams focused on the curved surfaces of the reference object 501 and object 502 can be used to detect multi-axis linear displacements as disclosed above. Each of these two light beams passes through an optical system that can detect the height (or linear displacement along the optical axis) and one- or two-dimensional angle of the normal direction of the light spot at the object surface relative to the optical axis. These light beams are preferably parallel, but this is not necessary as long as the relative directions of the two optical axes are known.

The advantages of the optical multi-axis linear displacement measurement system and the method thereof are simple structure, compact size, non-contact method, high response speed, capable of measuring multi-axis linear displacements at the same time without a plurality of displacement sensors provided at different directions, suitable for measurement on a small object, cost-effectiveness, and easily integrated with other precision measurement systems.

The preferred embodiments of the present invention described above are not intended to limit the present invention. Any person familiar with related art may make modifications and refinements that remain within the spirit and scope of the present invention. The scope of the claims of the present invention shall be determined by the claims attached to these specifications.

What is claimed is:

1. An optical multi-axis linear displacement measurement system, comprising:
   an object having a curved surface with a known surface profile; and
   an optical detection device having the known surface profile stored therein, the optical detection device being configured for generating and focusing a light beam on the curved surface of the object to form a light spot thereon, simultaneously measuring a linear displacement of the curved surface of the object along the axis of the light and an angle of the curved surface normal relative to the axis of the light at the light spot, determining a linear displacement in the direction perpendicular to the axis of the light from the detected angular displacement of the reflected light beam from the curved surface of the object and the known surface profile, and determining the multi-axis linear displacement of the object including the linear displacement along the axis of the light and the linear displacement in the direction perpendicular to the axis of the light,
   wherein the light spot moves on the curved surface of the object in response of the movement of the object when the linear displacement of the curved surface of the object and the angle of the curved surface normal relative to the axis of the light at the light spot are measured by the optical detection device.

2. The optical multi-axis linear displacement measurement system according to claim 1, wherein the curved surface of the object is a smoothly continuous convex or concave surface, which is used for reflecting the light.

3. The optical multi-axis linear displacement measurement system according to claim 2, wherein the surface is a columnar surface, a spherical surface, or a non-spherical surface.

4. The optical multi-axis linear displacement measurement system according to claim 2, wherein the surface of the object is produced by precision machining, film bending, or techniques used in fabricating microelectromechanical system (MEMS).

5. The optical multi-axis linear displacement measurement system according to claim 2, wherein the object preferably has a low thermal expansion coefficient.

6. The optical multi-axis linear displacement measurement system according to claim 2, wherein the surface of the object has a roughness of less than 5% of the diameter of the light beam.

7. The optical multi-axis linear displacement measurement system according to claim 1, wherein the object is attached by a supplementary surface having a known surface profile.

8. The optical multi-axis linear displacement measurement system according to claim 1, wherein the axis of the light is Z axis, and the one axis perpendicular to the axis of the light is X axis.

9. The optical multi-axis linear displacement measurement system according to claim 8, wherein the one-dimensional linear displacement in the direction of X axis is defined as x, an angle between Z axis and a normal direction of the surface is defined as θ, where the known surface profile of the object is defined as $Z_s=C(x)$, and $\theta=f(x)$ and $x=f^{-1}(\theta)$ can be determined from this profile, the linear displacement in the direction of Z axis measured by the optical detection device is defined as $Z_{measured}$, and a true linear displacement of the object in the direction of Z axis, $Z_{true}$, is calculated with the equation $Z_{true}=Z_{measured}+Z_s$, where $Z_s$ is more positive in the direction toward the optical detection device.

10. The optical multi-axis linear displacement measurement system according to claim 1, wherein the axis of the light is Z axis, and the two axes perpendicular to the axis of the light are X axis and Y axis.

11. The optical multi-axis linear displacement measurement system according to claim 10, wherein the two-dimensional linear displacement in the X-Y plane is defined as (x,y), a two-dimensional angle between Z axis and a normal direction of the surface is defined as $(\theta_x, \theta_y)$, where the known surface profile of the object is defined as $Z_s=C(x,y)$, and $(\theta_x,\theta_y)=f(x,y)$ and $(x,y)=f^{-1}(\theta_x, \theta_y)$ can be determined from this profile, the linear displacement in the direction of Z axis measured by the optical detection device is defined as $Z_{measured}$, and a true linear displacement of the object in the direction of Z axis, $Z_{true}$, is determined with the equation $Z_{true}=Z_{measured}+Z_S$, where $Z_s$ is more positive in the direction toward the optical detection device.

12. The optical multi-axis linear displacement measurement system according to claim 1, wherein the optical detection device comprises:
a lens assembly;
a light source disposed at one side of the lens assembly for generating the light beam;
a photo sensor disposed at another side of the lens assembly for receiving a reflected light beam; and
a micro-processing unit having a memory unit that stores the known surface profile, which is connected to the photo sensor.

13. The optical multi-axis linear displacement measurement system according to claim 12, wherein the lens assembly comprises:
a lens for focusing the light beam on the surface of the object;
an astigmatic lens for projecting the reflected light beam on the photo sensor; and
a beam splitter disposed between the lens and the astigmatic lens for splitting the light beam.

14. The optical multi-axis linear displacement measurement system according to claim 13, wherein the astigmatic lens is a cylindrical lens.

15. The optical multi-axis linear displacement measurement system according to claim 13, wherein the astigmatic lens is an inclined planar light refraction layer.

16. The optical multi-axis linear displacement measurement system according to claim 12, wherein the photo sensor comprises:
a first photo element;
a second photo element;
a third photo element;
a fourth photo element; and
wherein the first, second, third, and fourth photo element are disposed on four quadrants of a plane, respectively.

17. The optical multi-axis linear displacement measurement system according to claim 16, wherein signals $S_1$, $S_2$, $S_3$, and $S_4$ are generated, respectively, corresponding to the light intensity on the first, second, third, and fourth photo elements, and the multi-axis linear displacement of the object can be obtained by the signals and the surface profile.

18. The optical multi-axis linear displacement measurement system according to claim 1, wherein the surface of the object is a smoothly continuous curved surface comprising convexes and concaves, which are used for reflecting the light.

19. An optical multi-axis linear displacement measurement method, comprising:
providing an object, which has a curved surface with a known surface profile;
providing an optical detection device having the known surface profile stored therein for generating and focusing a light beam on the curved surface of the object to form a light spot thereon;
moving the object to make the light spot move on the curved surface of the object in response thereto;
simultaneously measuring a linear displacement of the curved surface of the object along the axis of the light and an angle of the curved surface normal relative to the axis of the light at the light spot;
determining a linear displacement in the direction of one axis perpendicular to the axis of the light from the detected angular displacement of the reflected light beam from the curved surface of the object and the known surface profile; and
determining the multi-axis linear displacement of the object including the linear displacement along the axis of the light beam and the linear displacement in the direction perpendicular to the axis of the light.

20. The optical multi-axis linear displacement measurement method according to claim 19, wherein the surface of the object is a smoothly continuous convex or concave surface, which is used for reflecting the light.

21. The optical multi-axis linear displacement measurement method according to claim 20, wherein the surface of the object is a cylindrical surface, a spherical surface, or a non-spherical surface.

22. The optical multi-axis linear displacement measurement method according to claim 20, wherein the surface of the object is produced with precision machining, film bending, or techniques used in fabricating microelectromechanical system (MEMS).

23. The optical multi-axis linear displacement measurement method according to claim 20, wherein the object preferably has a low thermal expansion coefficient.

24. The optical multi-axis linear displacement measurement method according to claim 20, wherein the surface of the object has a roughness of less than 5% of the diameter of the light beam.

25. The optical multi-axis linear displacement measurement method according to claim 19, wherein the axis of the light is Z axis, and the one axis perpendicular to the axis of the light is X axis.

26. The optical multi-axis linear displacement measurement method according to claim 25, wherein the one-dimensional linear displacement in the direction of X axis is defined as x, an angle between Z axis and a normal direction of the surface is defined as θ, where the known surface profile of the object is defined as $Z_s=C(x)$ and $θ=f(x)$ and $x=f^{-1}(θ)$ can be determined from this profile, the linear displacement in the direction of Z axis measured by the optical detection device is defined as $Z_{measured}$, and a true linear displacement of the object in the direction of Z axis, $Z_{true}$, is determined with the equation $Z_{true}=Z_{measured}+Z_s$, where $Z_s$ is more positive in the direction toward the optical detection device.

27. The optical multi-axis linear displacement measurement method according to claim 19, wherein the axis of the light is Z axis, and the two axes perpendicular to the axis of the light are X axis and Y axis.

28. The optical multi-axis linear displacement measurement method according to claim 27, wherein the two-dimensional linear displacement in the X-Y plane is defined as (x,y), a two-dimensional angle between Z axis and a normal direction of the surface is defined as $(θ_x, θ_y)$, where the known surface profile of the object is defined as $Z_s=C(x,y)$, and $(θ_x,θ_y)=f(x,y)$ and $(x,y)=f^{-1}(θ_x, θ_y)$ can be determined from this profile, the linear displacement in the direction of Z axis measured by the optical detection device is defined as $Z_{measured}$, and a true linear displacement of the object in the direction of Z axis, $Z_{true}$, is determined with the equation $Z_{true}=Z_{measured}+Z_S$, where $Z_s$ is more positive in the direction toward the optical detection device.

29. The optical multi-axis linear displacement measurement method according to claim 19, wherein the optical detection device comprises:
 a lens assembly;
 a light source disposed at one side of the lens assembly for generating the light beam;
 a photo sensor disposed at another side of the lens assembly for receiving the reflected light beam; and
 a micro-processing unit that has a memory unit that stores the known surface profile, which is electrically connected to the photo sensor.

30. The optical multi-axis linear displacement measurement method according to claim 29, wherein the lens assembly comprises:
 a lens for focusing the light beam on the surface of the object;
 an astigmatic lens for projecting the reflected light beam on the photo sensor; and
 a beam splitter disposed between the lens and the astigmatic lens for splitting the light beam.

31. The optical multi-axis linear displacement measurement method according to claim 30, wherein the astigmatic lens is a cylindrical lens.

32. The optical multi-axis linear displacement measurement method according to claim 30, wherein the astigmatic lens is an inclined planar light refraction layer.

33. The optical multi-axis linear displacement measurement method according to claim 29, wherein the photo sensor comprises:
 a first photo element;
 a second photo element;
 a third photo element;
 a fourth photo element; and
 wherein the first, second, third, and fourth photo element are disposed on four quadrants of a plane, respectively.

34. The optical multi-axis linear displacement measurement method according to claim 33, wherein signals $S_1$, $S_2$, $S_3$, and $S_4$ are generated, respectively, corresponding to the light intensity on the first, second, third, and fourth photo elements, and the multi-axis displacement of the object can be obtained by the signals and the surface profile.

35. The optical multi-axis linear displacement measurement method according to claim 19, wherein the known surface profile is obtained by measuring the surface of the object.

36. The optical multi-axis linear displacement measurement method according to claim 35, wherein the surface profile is obtained by a SEM (Scanning electron microscope), an AFM (Atomic force microscope), a surface profilometer or/and white light interferometer.

37. The optical multi-axis linear displacement measurement method according to claim 19, further includes calibration of the linear movement of the object with interferometers, and an alignment-calibrating in the X, Y and Z axis of the object with three interferometers and obtaining a calibrated information, and storing the calibrated information in the optical detection device.

38. The optical multi-axis linear displacement measurement method according to claim 19, wherein the object is attached by a supplementary surface having a known surface profile.

39. The optical multi-axis linear displacement measurement method according to claim 19, wherein the surface of the object is a smoothly continuous curved surface comprising convexes and concaves, which are used for reflecting the light.

40. The optical multi-axis linear displacement measurement method according to claim 39, further includes:
 repeating the steps of claim 18;
 storing in the optical detection device; and
 repeating the above-mentioned steps.

41. The optical multi-axis linear displacement measurement method according to claim 40, further includes:
 deriving the stored surface profile; and
 recovering to a calibration state.

* * * * *